United States Patent
Meersschaert

(10) Patent No.: US 10,201,217 B2
(45) Date of Patent: Feb. 12, 2019

(54) MULTI-MATERIAL STRUCTURE AND FORMING OF A LUGGAGE CASE

(75) Inventor: Reinhard Meersschaert, Merlebeke (BE)

(73) Assignee: Samsonite IP Holdings S.a.r.l., Luxembourg (LU)

( * ) Notice: Subject to any disclaimer, the term of this patent is extended or adjusted under 35 U.S.C. 154(b) by 712 days.

(21) Appl. No.: 13/882,340

(22) PCT Filed: Oct. 28, 2011

(86) PCT No.: PCT/EP2011/069066
§ 371 (c)(1),
(2), (4) Date: Apr. 29, 2013

(87) PCT Pub. No.: WO2012/056035
PCT Pub. Date: May 3, 2012

(65) Prior Publication Data
US 2013/0213752 A1    Aug. 22, 2013

Related U.S. Application Data

(60) Provisional application No. 61/408,399, filed on Oct. 29, 2010.

(51) Int. Cl.
*A45C 5/00*     (2006.01)
*A45C 5/02*     (2006.01)
(Continued)

(52) U.S. Cl.
CPC .................. *A45C 5/00* (2013.01); *A45C 5/02* (2013.01); *A45C 5/03* (2013.01); *B29D 22/00* (2013.01);
(Continued)

(58) Field of Classification Search
CPC .... A45C 5/02; A45C 3/00; A45C 3/02; A45C 5/00; A45C 5/03
(Continued)

(56) References Cited

U.S. PATENT DOCUMENTS 2,357,037 A * 8/1944 Wheary Jr. .............. A45C 5/02
                                                         190/119
3,292,252 A * 12/1966 Reading ................... A45C 5/02
                                                         190/124
(Continued)

FOREIGN PATENT DOCUMENTS

CN    1067167 A    12/1992
CN    1107317 A     8/1995
(Continued)

OTHER PUBLICATIONS

International Search Report of corresponding International patent application No. PCT/EP2011/069066, dated May 7, 2012, 3 pages.

*Primary Examiner* — Fenn C Mathew
*Assistant Examiner* — Cynthia Collado
(74) *Attorney, Agent, or Firm* — Dorsey & Whitney LLP

(57) ABSTRACT

A luggage case shell may be formed in a molding step. The luggage case shell may including an outer layer formed from a softer material, and a skeletal frame formed from a harder material. The skeletal frame may support the outer layer. A base frame may be joined to the outer layer and the skeletal frame. The base frame may support a telescoping handle and wheels. A foam layer may be positioned between the skeletal frame and the outer layer. Inner surfaces of the skeletal frame and the foam layer may be substantially co-planar. The outer layer and the skeletal frame may be joined in a pressing or molding operation. During the pressing or molding operation, the shell may also be shaped. The base frame
(Continued)

or the foam layer may also be joined to the outer layer and the skeletal in the pressing or molding operation.

20 Claims, 12 Drawing Sheets

(51) Int. Cl.
    *A45C 5/03*     (2006.01)
    *B29D 22/00*     (2006.01)
    *A45C 5/06*     (2006.01)
    *A45C 5/14*     (2006.01)

(52) U.S. Cl.
    CPC ............... *A45C 5/06* (2013.01); *A45C 5/14* (2013.01); *A45C 2005/035* (2013.01)

(58) Field of Classification Search
    USPC .... 190/100, 124, 125, 113–115, 123, 23–28, 190/119; 206/320, 557, 62.11, 523; 220/592.25, 62.11, 640; 29/415, 428, 29/434, 458; 264/271.1, 148
    See application file for complete search history.

(56) References Cited

U.S. PATENT DOCUMENTS

| | | | | |
|---|---|---|---|---|
| 3,553,822 A * | 1/1971 | Bergh | ............... | A45C 5/02 29/445 |
| 3,579,804 A * | 5/1971 | Slan | ............... | A45C 5/02 190/115 |
| 3,724,057 A * | 4/1973 | Holtzman | ............... | A45C 5/00 190/121 |
| 3,737,980 A * | 6/1973 | Kotkins | ............... | A45C 5/02 190/28 |
| 4,773,147 A * | 9/1988 | Schurman | ............... | A45C 5/02 206/527 |
| 2004/0101669 A1* | 5/2004 | Chang | ............... | A45C 5/02 428/212 |
| 2004/0117973 A1* | 6/2004 | Fenton | ............... | A45C 5/02 29/469 |
| 2007/0215427 A1 | 9/2007 | Rekuc et al. | | |
| 2007/0296117 A1* | 12/2007 | Taeye | ............... | B29C 51/087 264/271.1 |
| 2011/0113615 A1* | 5/2011 | Cho | ............... | A45C 5/02 29/527.1 |

FOREIGN PATENT DOCUMENTS

| | | |
|---|---|---|
| CN | 1167429 A | 12/1997 |
| CN | 1336804 A | 2/2002 |
| CN | 201011904 Y | 1/2008 |
| WO | 01/28381 A1 | 4/2001 |
| WO | 2012056035 A2 | 5/2012 |

* cited by examiner

MULTI-MATERIAL STRUCTURE AND FORMING OF A LUGGAGE CASE

CROSS-REFERENCE TO RELATED APPLICATIONS

This application is the national stage application of PCT Patent Application No. PCT/EP2011/069066, filed on 28Oct. 2011 and entitled "Multi-Material Structure and Forming of a Luggage Case," which claims the benefit under 35 U.S.C. § 119(e) to U.S. Provisional Patent Application No. 61/408,399, filed on 29Oct. 2010 and entitled "Multi-Material Structure and Forming of a Luggage Case."

TECHNICAL FIELD

The present disclosure relates to luggage cases, and more particularly to the use of multiple materials in the formation and structure of luggage cases.

BACKGROUND

Hardside luggage cases provide excellent stiffness and support by using formable, hard materials, such as ABS or other materials having a generally uniform thickness, to create a protective cover for the contents of the case. One issue with hardside luggage cases is that they are typically heavier than softside luggage cases, and external pockets are difficult to form on hardsided luggage.

Softsided luggage cases are built by using fabric layers to cover an internal frame structure. These luggage cases are relatively light-weight, but do not offer robust protection of the content as hardsided luggage cases do. Exterior pockets are able to be formed on softsided luggage cases by application of gussets, covers and fasteners, such as zippers, snaps or Velcro®.

Traditional hybrid luggage cases combine hardsided and softsided luggage structures to allow for a luggage case with one portion (i.e. the base of a duffel) being hardsided and another portion (i.e. the top of a duffle) being softsided, with the two portions being secured to each other by sewing or other type of mechanical fastening. This type of fastening creates seams, which can disturb the design aesthetics of the luggage case. Exterior pockets are able to be formed on the softsided portion of the traditional hybrid luggage case.

What is needed is a luggage case, and method of making, that allows for a combination of hardsided and softsided characteristics, including a sufficient skeletal structure to protect the contents, softsided versatility for implementing exterior pockets, and an overall light weight.

SUMMARY

One embodiment of a luggage case may include at least one shell. The at least one shell may include a skeletal frame integrally formed with and supporting an outer layer of material. In some versions of the luggage case, the at least one shell may be formed in one molding step. In other versions of the luggage case, said outer layer of material may include a major face, two or more minor faces, and an absence of seams in transitions between the major and minor faces and in transitions between the minor faces. In yet other versions of the luggage case, a base frame may be integrally formed with a portion of the skeletal frame and the outer layer of material. In still more versions of the luggage case, an intermediate layer may be interposed between the outer layer of material and the skeletal frame. The intermediate layer may be a foam.

One embodiment of a method of forming a luggage case shell may include positioning a skeletal frame in discrete areas on a sheet of an outer material, and forming a luggage shell where the skeletal frame supports the outer material in the formed shape. Some versions of the method may include joining a foam to the outer material prior to positioning the skeletal frame on the outer material. Other versions of the method may involve forming the luggage shell by pressing the skeletal frame and the outer material together. Yet other versions of the method may involve using a mold to permanently join the skeletal frame and the outer material together. Some of these molding versions of the method may further include heating the skeletal frame and the outer material prior to using the mold, or applying an adhesive to at least one of the skeletal frame or the outer material prior to using the mold. Some versions of the method may include positioning a base frame on the outer material, the skeletal frame, or both the outer material and the skeletal frame prior to forming the luggage shell. In some of these base frame versions of the method, the base frame in conjunction with the skeletal frame may support the formed shape absent other frame structures. In yet other versions of the method, the skeletal frame may support the outer material in the formed shape absent other frame structures Another embodiment of a method of forming a luggage case shell may include joining an outer material to a skeletal frame positioned on the outer material in discrete areas to form a laminate material at a first location. The method may further include forming, at a second location geographically separate from the first location, a luggage shell using the laminate material where the skeletal frame supports the outer material in the formed shape absent other frame structures.

DETAILED DESCRIPTION

The construction of a luggage case having a combined hardside and softside functional characteristics, and the related method of forming, is described herein. The resulting luggage case may include a shell formed using a base layer and a structural layer that are integrated together when shaping the shell during a single molding step. The shell may include both rigid materials having generally uniform thickness and fabric parts that are joined to the rigid materials. This structure gives strength and protection of the contents where needed, and offer softness and exterior pockets where the rigid materials are not located. The carry handles, pull handles, and wheel features can be anchored to or formed into the portions of the luggage case that include the hardside material, and the external pockets and other features common to softsided luggage cases can be included in the fabric portions.

In short, one side (or clamshell) of a luggage case may made out of one or more pieces of fabric, on which different types of reinforcement or structural materials are positioned, prior to forming, as desired to provide the structural and aesthetic properties desired for the final formed product. The external shell shape may have the look of a hardsided shell covered in fabric, with an integral skeletal frame formed more rigid materials allowing for clean design features akin to a hardsided luggage case, yet allow for the application of pockets in the softsided portions. The luggage case may be light weight, with beneficial structure to weight ratios. The pockets and lining materials may be built into the sandwich of materials used in the formation step for further enhancement to the resulting product.

Although the shells are described and depicted herein with reference to an upright luggage case, the shells can be utilized with other types of luggage cases, such as spinners, attaches, carry-ons, backpacks, cosmetic cases, or the like. Also, the luggage cases may have carry handles, retractable towing handles, fixed or caster wheels. The luggage cases may include two half-shells releasably connected together by a zipper, latches, fasteners or any combination thereof. The luggage cases may be attached together using an expandable zipper gusset or mechanical ratcheting gusset, or the like. The luggage shells may be pivotal relative to each other by a hinge structure, such as a fabric hinge, piano hinge, discrete hinges, a zipper hinge or other types sufficient for the purpose.

Figure 1:
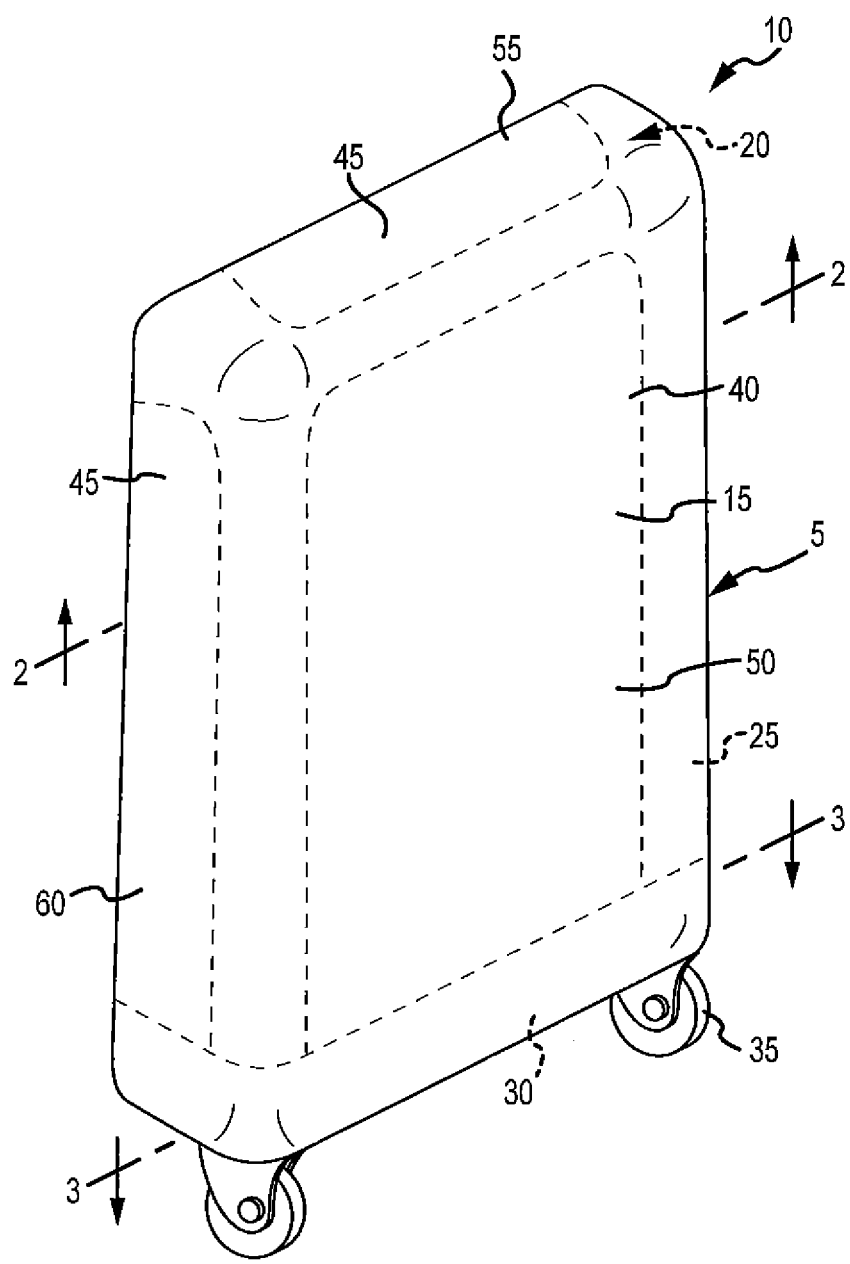
FIG. 1 shows a luggage shell formed using multiple materials that are joined together when forming the luggage shell into a desired shape.

FIG. 1 shows one example of a single shell 5 of a luggage case 10 formed by joining together two or more different materials. This shell 5 may assembled together with another similar shell (not shown), and releasably secured together as described above. The external surface of the luggage case 10 may be an outer layer 15 of one of more fabrics or the like, supported in a predetermined shape by a structural layer 20 formed on the inside of the outer layer. The structural layer 20 may include a skeletal frame 25 and a base frame 30. The base frame 30 may be formed at the bottom of the shell 5 (as oriented in FIG. 1) to support the application of wheels, support feet, and retractable handle structures. The overall appearance of the luggage shell 5, and the assembled luggage case 10, may be one of a hard sided luggage case. The corners may be rounded with the major and minor faces 40, 45 having relatively few, if any, sewing or other type of seams, which are typically used to assembled luggage cases. As described below, the outer layer 15 may also be modified to include external pockets.

The type of material used as the outer layer 15 of the shell 5 (generally referred to as "softer material" herein) in this structure and method is one that is formable in a heated, plug-molding (or similar type) process, such as nylon, polyester, cotton or other textiles, polyurethane ("PU") or other soft thermoplastic materials, ethylene vinyl acetate ("EVA"), and may be woven, non-woven or knitted fabrics. The skeletal frame 25 may be a relatively rigid or semi-rigid material (generally referred to as "harder material" herein), such as EVA, acrylonitrile butadiene styrene ("ABS"), polycarbonate ("PC") or polypropylene ("PP"), polyolefin (e.g., polypropylene or polyethylene) foam or other type of foam, a combination of these, or others suitable for the purpose, that are adherable to the fabric and sufficiently strong to support the fabric in the shape of a luggage shell. If the skeletal frame is formed using a foam, a glass fiber web may be joined to an outer facing side, an inner facing side, or both sides, of the foam to enhance the stiffness of the foam. The base frame 30 may be a typical material, such as ABS or the like, which provides sufficient strength for attaching typical hardware. The base frame 30 is optional. The innermost layer could be the liner of the luggage case 10, which may also be formed as part of the shell during the forming process. The liner may be made of a woven, non-woven, or knitted textile of any suitable material, including polyester, cotton, nylon or other.

More specifically referring to FIG. 1, the shell 5 may include a front face 50, a top face 55, opposing side faces 60, and a bottom face (not shown). The skeletal frame 25 may extend along the length of the edges in the shell 5, where the major face 40 transitions to a minor face 45, and where a minor face 45 transitions to another minor face 45. The shape of the transition may be defined by the shape of the skeletal frame 25 along those areas, and may vary from a "sharp" transition having a small radius of curvature to a "smooth" transition having a relatively large radius of curvature. In FIG. 1, the transition between faces is medium.

The skeletal frame 25 provides support for the outer layer 15 around these shaped transition edges, and holds the outer layer 15 taunt across the major and minor faces 40, 45. In this example, the skeletal frame 25 may include four lengths that form a box around the edges of the major face 40, and also lengths extending from the corners of the box to form at least a partial perimeter of the minor faces 45 (see FIG. 3). The skeletal frame 25 may be adhered to the inside surface of the outer layer 15, or to another layer of material interposed between the outer layer 15 and the skeletal frame 25, and may help keep the outer layer 15 in position, and supported in its formed shape. Each length of the skeletal frame 25 may have a width that is sufficiently large so that the portions of the skeletal frame 25 extend into the fields of the major and minor faces 40, 45 a sufficient amount to ensure adherence with the outer layer 15, as well as provide sufficient structural strength to support the outer layer 15 in its desired formed shape. One suitable width, among many, may be approximately six centimeters. Other width dimensions may also suffice, including, but limited to, width dimensions from 1 centimeter or greater up to approximately 40 centimeters. Other support areas on the luggage case shell 5 might be included on the top of the corner frame structure, the middle of the structure or other locations, depending on the outside shape/design and required structure for the luggage case shell.

Figure 2:
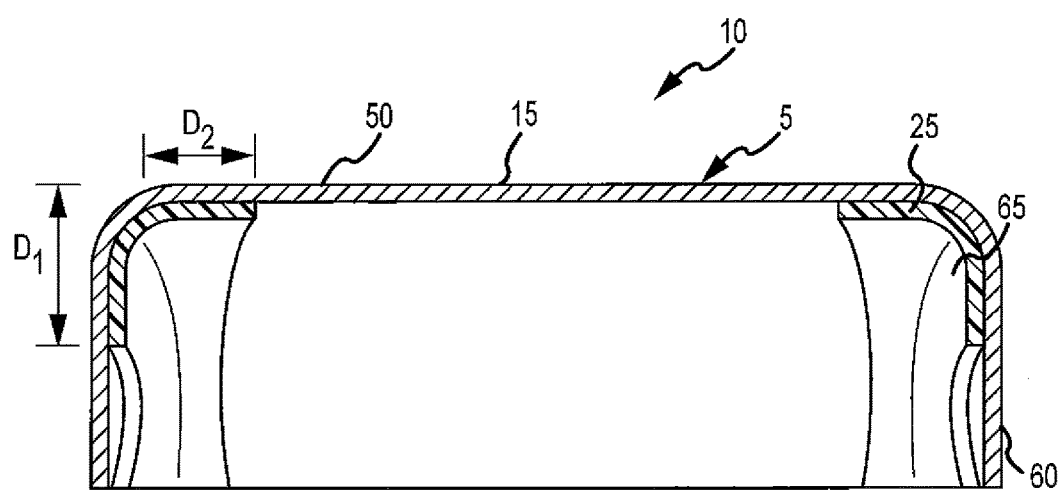
FIG. 2 shows a schematic cross-section view of the luggage shell of FIG. 1, taken along line 2-2 of FIG. 1.

FIG. 2 is a section taken through the luggage shell 5 of FIG. 1 along line 2-2. FIG. 2 shows the inside of the luggage shell 5, and in particular the skeletal frame sections 65 supporting the outer layer 15 and defining the front and side faces 50, 60. The skeletal frame sections 65 extend a distance "D" from the apex of the corner curve into the faces 50, 60 to provide sufficient support to the outer layer 15. The distance D for each extension may be the same or different (e.g., D1=D2, or D1 not=D2), depending on the necessary structural support required for the particular shape. One range of widths for D is three centimeters. The thickness of the skeletal frame 25 may vary along the length of the particular section depending on the necessary structural strength needed to support the outer layer 15 and the luggage case 10 in the desired shape when loaded with contents. One range of thickness for the skeletal frame 25 is 0.5 to 10.0 millimeters ("mm"), and may be 1.3 mm for ABS, or 3 mm to 7 mm, and may be 5 mm for EVA. The range of thicknesses of the skeletal frame 25 may be greater or less than that disclosed herein based on the material used and the structural support required for the particular design.

Figure 3:
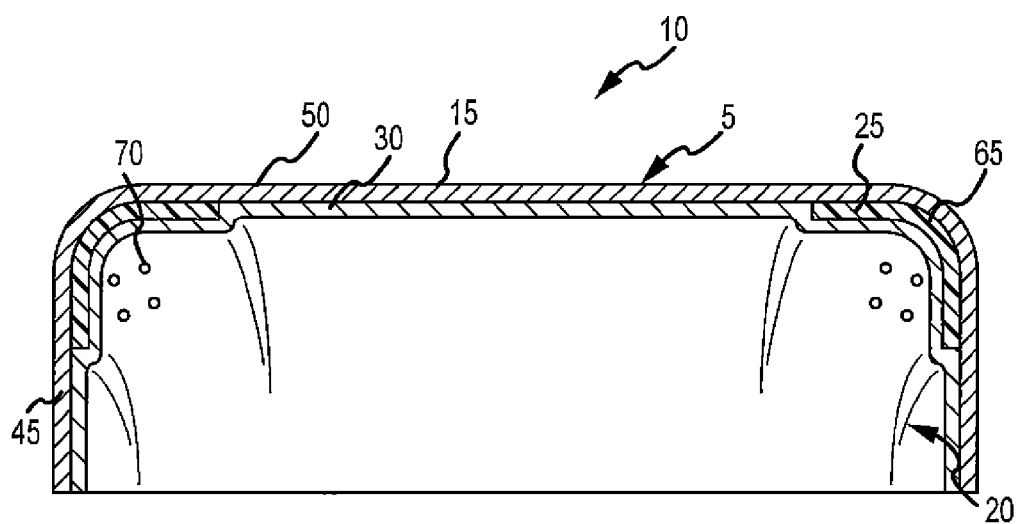
FIG. 3 shows a schematic cross-section view of the luggage shell of FIG. 1, taken along line 3-3 of FIG. 1.

FIG. 3 is a section taken through the luggage shell 5 of FIG. 1 along line 3-3. FIG. 3 shows the inside of the luggage shell 5, and in particular the sandwich layering at this end, including the outer layer 15, the skeletal frame sections 65, and the base frame 30.

The base frame 30 may be positioned along the bottom surface of the luggage case 10 and may extend a distance up the major and minor faces 40, 45 to provide a strong bottom to the luggage shell 5. The base frame 30 may be ABS, and thus provides a strong and resilient structure to anchor the wheels, extension handle, and provide added toughness to the bottom of the luggage shell 5 where it is likely to see impact. Fasteners 70 are shown in the corner of the shell 5 in FIG. 3 extending through the sandwich of materials to secure on a spinner-type caster wheel. The base frame 30 may have a thickness in the range of 1 to 5 mm, and preferably 1.3 mm, if ABS. Different materials would require different thicknesses. The bottom surface of the luggage shell 5 may be formed with concave recesses to allow the inset of wheels into the perimeter of shell 5, as is commonly done.

With continued reference to FIG. 3, the outer layer 15, the skeletal frame 25, and the base frame 30 may be positioned appropriately to provide the desires shape and structural support for the shell 5. The base frame 30 may cover almost the entirety of the inside of the bottom surface of the luggage shell 5 as one integral sheet, but may be applied in different shapes, or in wholly separate sheets set in particular orientations, in order to provide the desired structural support and strength. A third frame, similar to the base frame 30, may also be applied to other portions of the luggage case 10, such as the inside of the top surface in order to anchor a carry handle. The skeletal frame 25 may be sandwiched between the outer layer 15 and the base frame 30.

In some embodiments, the skeletal frame 25 may not extend beyond the edge of the base frame 30, and instead butt up against or terminate adjacent to a lateral edge of the base frame 30. As such, the sandwich of FIG. 3 would then be only two layers thick. The inclusion of the skeletal frame 25 between the outer layer 15 and the base frame 30 would likely provide an improved structural performance over the two-layer structure, all else equal. Elements that form the skeletal frame 25 might be side-by-side or partly overlapping as well. The various components of the structural layer 20, including the skeletal frame 25 and the base frame 30, may have different thicknesses at different locations in the sidewall. The use of different thicknesses allows the luggage case 10 to be designed to provide sufficient strength in different portions of the luggage case 10 without having to use the same structural support throughout based on having the same thickness throughout. Further, the elements forming the skeletal frame 25 may have different thicknesses. The different thicknesses of the skeletal structural elements may take the form of integral strips having different thicknesses where needed, separate strips laid end to end or slightly overlapping, or the skeletal structural material may be sprayed onto the outer layer 15, all prior to the forming step.

Figure 4:
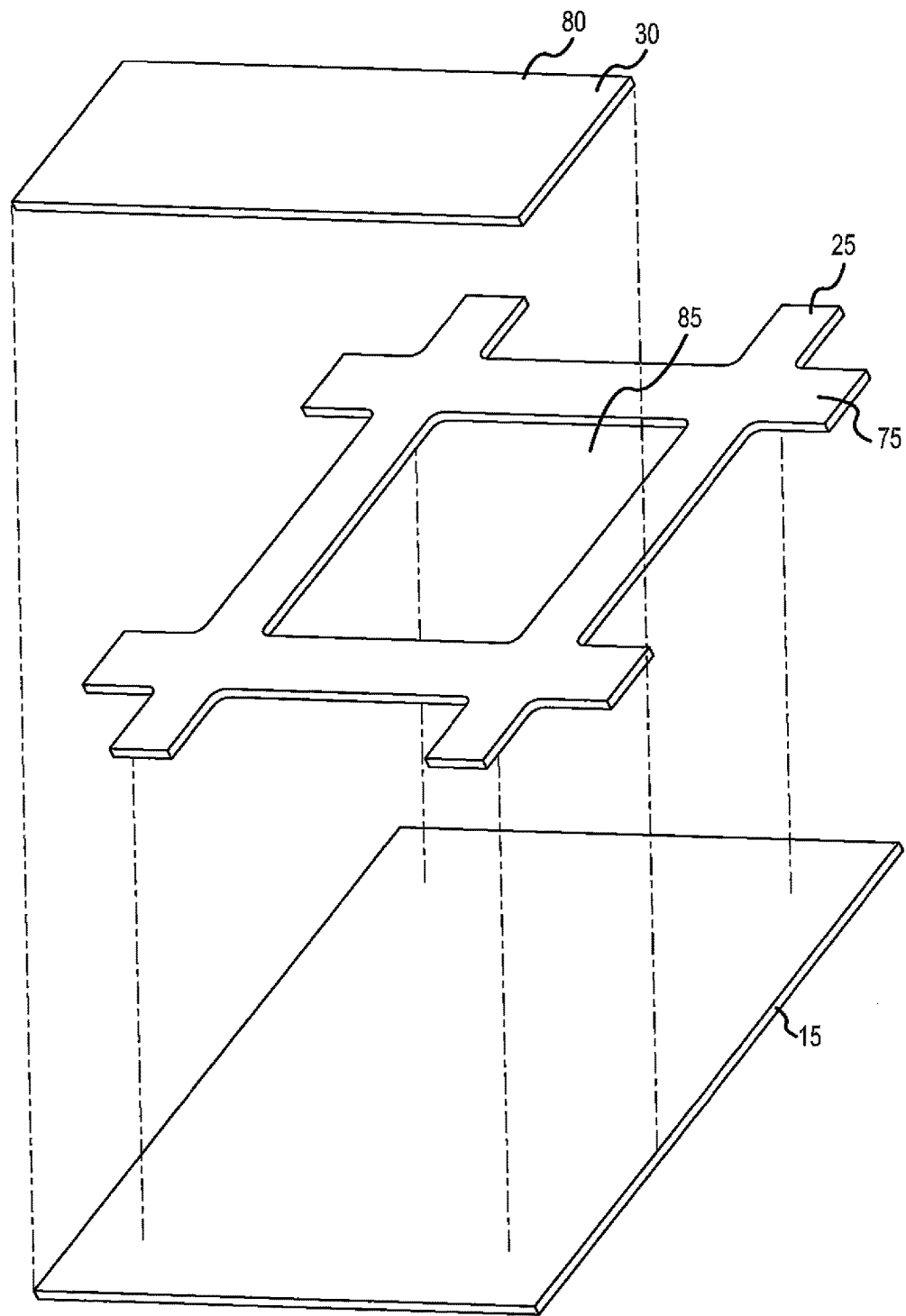
FIG. 4 shows an exploded view of one example of the multiple materials used to form the luggage shell of FIG. 1 in one processing/forming step.

The shell structure described above with respect to FIGS. 1-3 may be made by a forming method using a sandwich of layers of different materials. As shown in FIG. 4, for example, the outer layer 15, which may be a sheet of fabric material or the like, with its exterior side facing down (with reference to FIG. 4) acts as the bottom layer of the sandwich. On top of the bottom layer, the skeletal frame material 75 is laid out as desired and positioned over the outer layer 15 for application thereto. The base frame material 80 is then positioned over the skeletal frame material 75. These three components then form the sandwich of FIG. 5. Adhesives may be used, or none at all, to fix the different material layers on each other. The adhesives may be hot melt glues, glue foils, solvent glues, powder glues, or other types of glue. These adhesives may be applied to the surfaces of each, or some, of the components prior to the forming step. These adhesives may be applied by spraying, rolling, scattering, or spreading them on the various components.

As mentioned above, the skeletal frame 25 may not be sandwiched between the base frame 30 and the outer layer 15. The skeletal frame 25 may be continuous or may have apertures 85 of any type formed therein to expose the underlying layers. In some embodiments, the skeletal frame 25 may be formed by forming a repeating pattern of holes in a plate. The outer layer 15 may be one piece of material to form the entire shell 5 (for instance as shown in FIG. 1), or may be multiple pieces adhered or attached together for aesthetic or functional reasons. The skeletal frame 25, or portions of the skeletal frame 25, may be uncovered to show through the final product. There may be more than one skeletal frame 25, and more than one base frame 30. The skeletal frame(s) 25 and base frame(s) 30 may be positioned variously around the luggage case shell 5 as necessary to create sufficient structure and desired shape based on the intended design. Also, the liner may be a layer, and the internal portions of a pocket may be included in the sandwich layer in order to form an entire shell, including the liner, in one molding/forming step.

Figure 5:
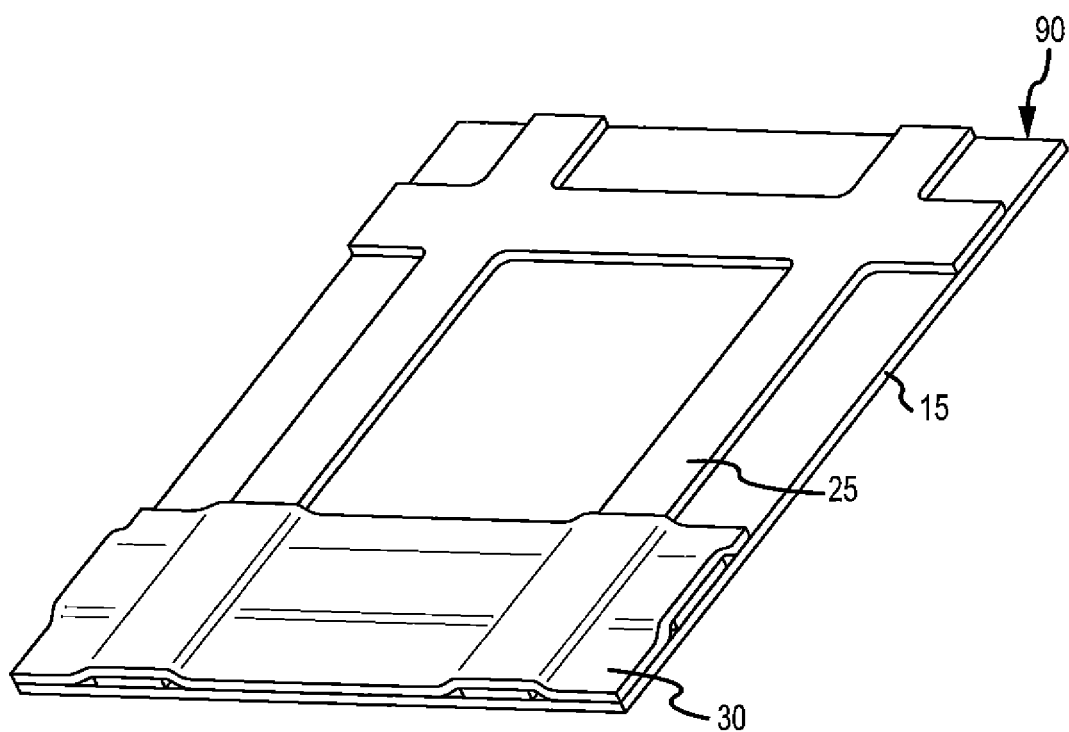
FIG. 5 shows the multiple materials of FIG. 4 joined together.
Figure 6:
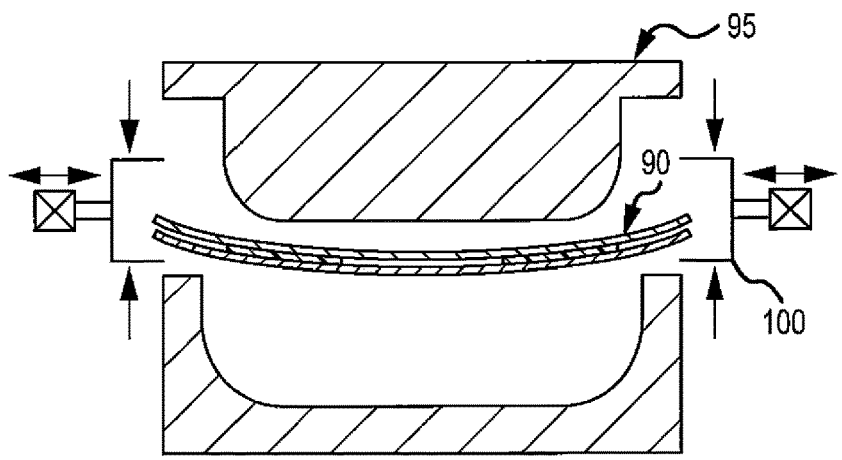
FIG. 6 shows one example of a forming method, such as a plug mold, for forming the layers into a luggage case shell in one forming step.
Figure 7:
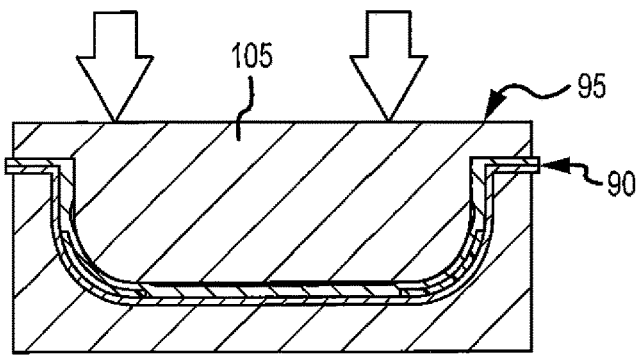
FIG. 7 shows the plug of FIG. 6 in its molding position and received in the mold recess.
Figure 8:
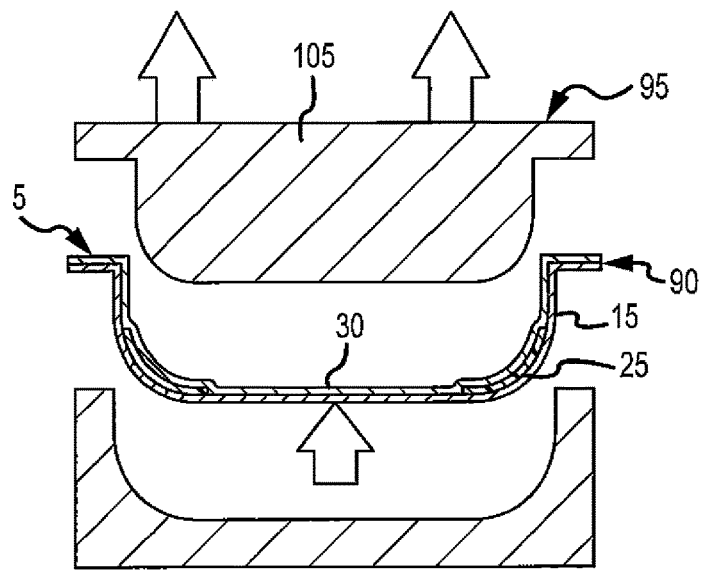
FIG. 8 shows the plug being removed from the mold of FIG. 6, and the formed shell being released from the mold for further processing.

The molding process for forming the sandwich material 90 of FIG. 5 into a luggage shell 5, such as that shown in FIG. 1, is shown in FIGS. 6, 7, and 8. This molding process may be a plug molding (also called press forming) process. The molding process may be a different molding process, such as vacuum forming or similar, as well.

FIG. 6 shows the components for the shell 5 positioned in the molding machine 95 prior to the molding step. The individual components are shown separated for clarity, but may also be in engagement with each other. At this point, the sandwich material 90 may be temperature treated, such as heated or cooled, or left at room temperature. Also, at least a periphery of the sandwiched material 90 may be engaged by clamps 100 to control or apply tension to the materials before, during or after the molding process. The clamps 100 may engage the sandwich material 90 around its entire periphery, or may engage the sandwich material 90 only in discrete positions along its edges. The clamps 100 may be fixed and not move at all, or may be allowed to move under the tension of the sandwich material 90 caused by the molding process. The clamps 100 may also be designed to apply a relatively fixed tension, such as by a spring apparatus, or may be designed to apply a programmed, actively driven tension, such as by hydraulic or pneumatic cylinders programmed with the particular molding process. The clamps 100 may also allow friction slippage of the sandwich material 90 through the clamps 100 as the sandwich material 90 is put under tension by the molding process. In any event, the tension, drape and other characteristics of the molding process are considered in designing the clamp and molding technique. The clamps 100 may also be driven by servo motors as well. The movement of the clamps 100 may be pre-programmed or may be responsive to the performance parameters of the molding process (temperature, pressure, tension, time, etc.).

FIG. 7 shows the molding process mid-stream, with the plug 105 having moved downwardly to push the sandwich material 90 into the mold to take on the form of the luggage shell 5. The clamps 100 are not shown for clarity purposes. This step of the process may include heating or cooling, or no heat treatment.

FIG. 8 shows the molded sandwich material 90 after the plug 105 is removed, and the shell 5 is freed from the mold. The shell 5, after trimming, now has the desired shape formed by the sandwiched material 90, with the skeletal frame 25 forming the support for the outer layer 15, and the base frame 30 forming the structure for securing the wheels, retractable handle, and the like. Exterior pockets, zippers, hinges, liners, wheels, and fasteners to engage with another shell to form a full luggage case may be formed in, or joined, to the shell 5.

Figure 9:
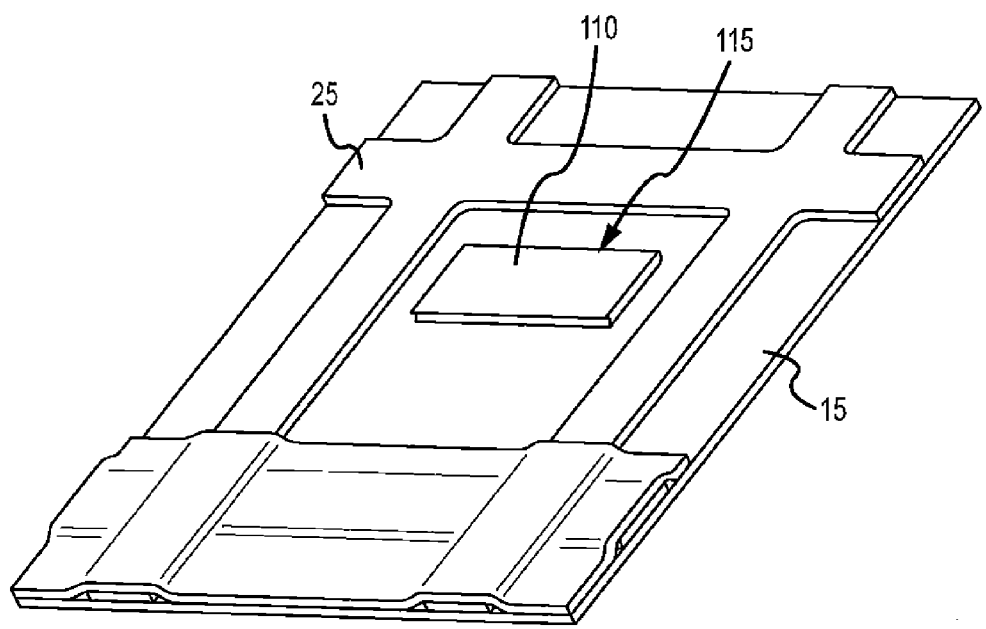
FIG. 9 shows the pocket applied to the laminate prior to forming.

The pockets may be formed in different ways. They may be formed before or after forming of the shell 5. If made before forming, a lining 110 for the pockets 115 may stitched onto the outer layer 15 while it is still flat, and typically before the lamination with the skeletal frame 25. See FIG. 9. A slit may be formed in the outer layer 15. The zipper may also be positioned proximate the slit at this stage, with flat stitching (low profile) or welding techniques being useful for joining the zipper to the outer layer 15. A pocket 115 (such as a fabric pocket) may then be positioned adjacent the slit and on the inside surface of the outer layer 15, and the edges of the pocket material proximate the pocket opening may attached (such as with flat stitching) to the edges of the slit, to complete the pocket 115.

A liner may or may not be laminated together with the prepared outer layer, pocket material, and structural layer, which together form the laminate. After forming, the shell 5 may include the pocket 115 with integrated pocket, zipper and liner in place. Other features might be fixed before the forming as well, such as handles, quick-hooks, logo badges, etc.

Figure 10:
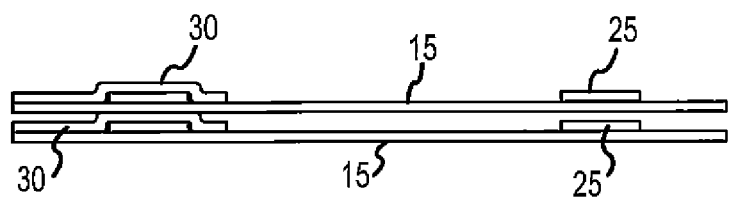
FIG. 10 shows a plurality of lamina stacked and ready for shipment to a separate location for forming and final assembly.

With the laminate formed this way, with or without pockets, it is possible to prepare them in one location and ship them efficiently to a second location for forming. For instance, the laminates could be prepared in a first location, say China, or other locations, and shipped to a location second location, say the Netherlands, which is much closer to the distribution or sales centers, for forming and final assembly. The difference in location between China and the Netherlands is considered one definition of geographically separate, although the distance is not a key factor in the definition. Forming the laminate into a shell 5 and performing final assembly of the formed shell 5 in a location closer to the sale or distribution regions, other than where the laminate is assembled, is one intended meaning. Another intended meaning is that the laminate may be formed and finally assembled at a location that is less expensive than where the laminate is assembled is another intended meaning. This would allow for better control of the financial, physical, and supply characteristics of the product. The shipping would be more efficient, and thus less expensive, because the flat laminates could be stacked and shipped in a much more compact way than already-formed luggage shells. In this case, the advantage is in shipping prepared laminates and forming/assembling the laminates close to distribution or sales locations. See FIG. 10.

Figure 11:
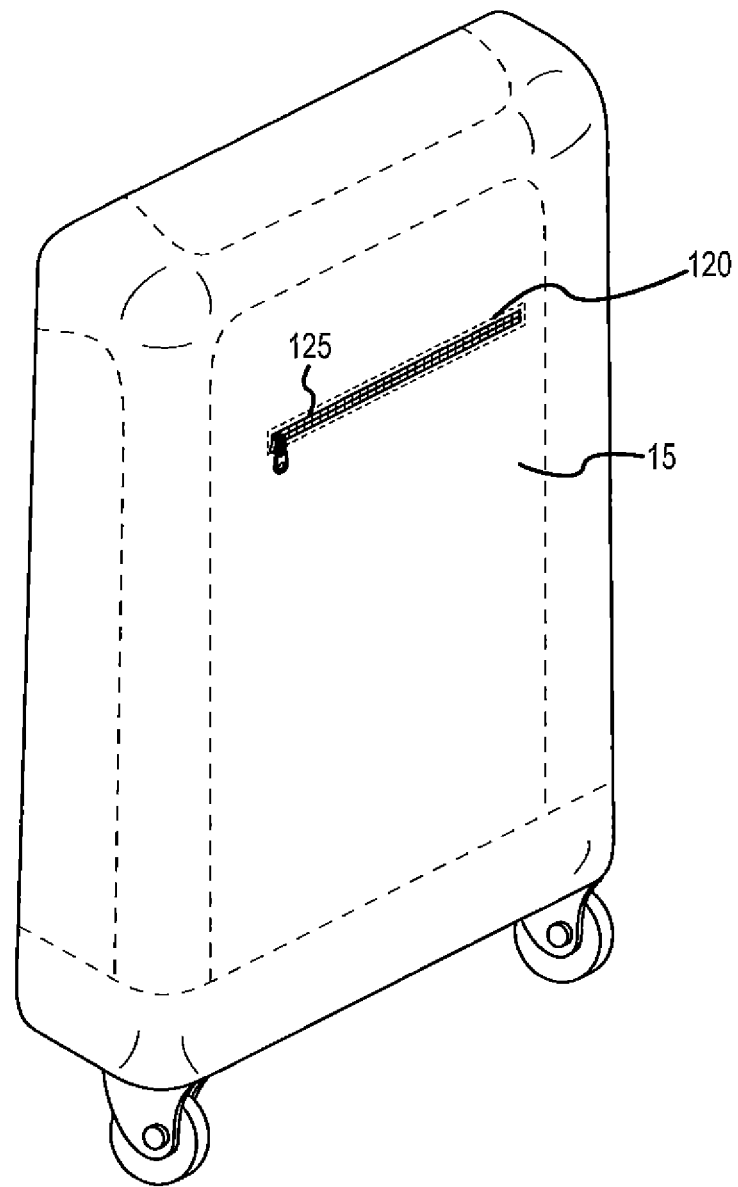
FIG. 11 shows the pocket applied to the shell after forming.

If the pocket 115 is formed after the forming step, a slit 120 (a long, narrow opening) may be cut into the outer layer 15. A zipper 125 or other closure mechanism and edges of the pocket material proximate an open end of the pocket 115 may be stitched or welded to the outer layer 15 proximate the slit 120. See FIG. 11. The inside exposed surfaces of the shell 5 may then covered with a separate liner after the pocket forming steps.

One or more pockets may be joined to an outer surface of the shell. A pocket may be joined to the outer surface by joining a pocket material to the outer surface of the outer layer 15. The pocket material may be joined by any suitable method, including, but not limited to, by stitching or welding. The pocket material may be sized to be approximately the size of the pocket, and may be formed out of any suitable softer material. The pocket material may be joined to the shell prior to, or after joining, the outer layer 15 to the structural layer 20. A zipper or other closure may be positioned proximate to an opening formed between the pocket material and the outer layer 15 to provide selective access to the pocket. The zipper or other closure mechanism may be stitched or welded to the outer layer 15 and the pocket material.

Figure 12:
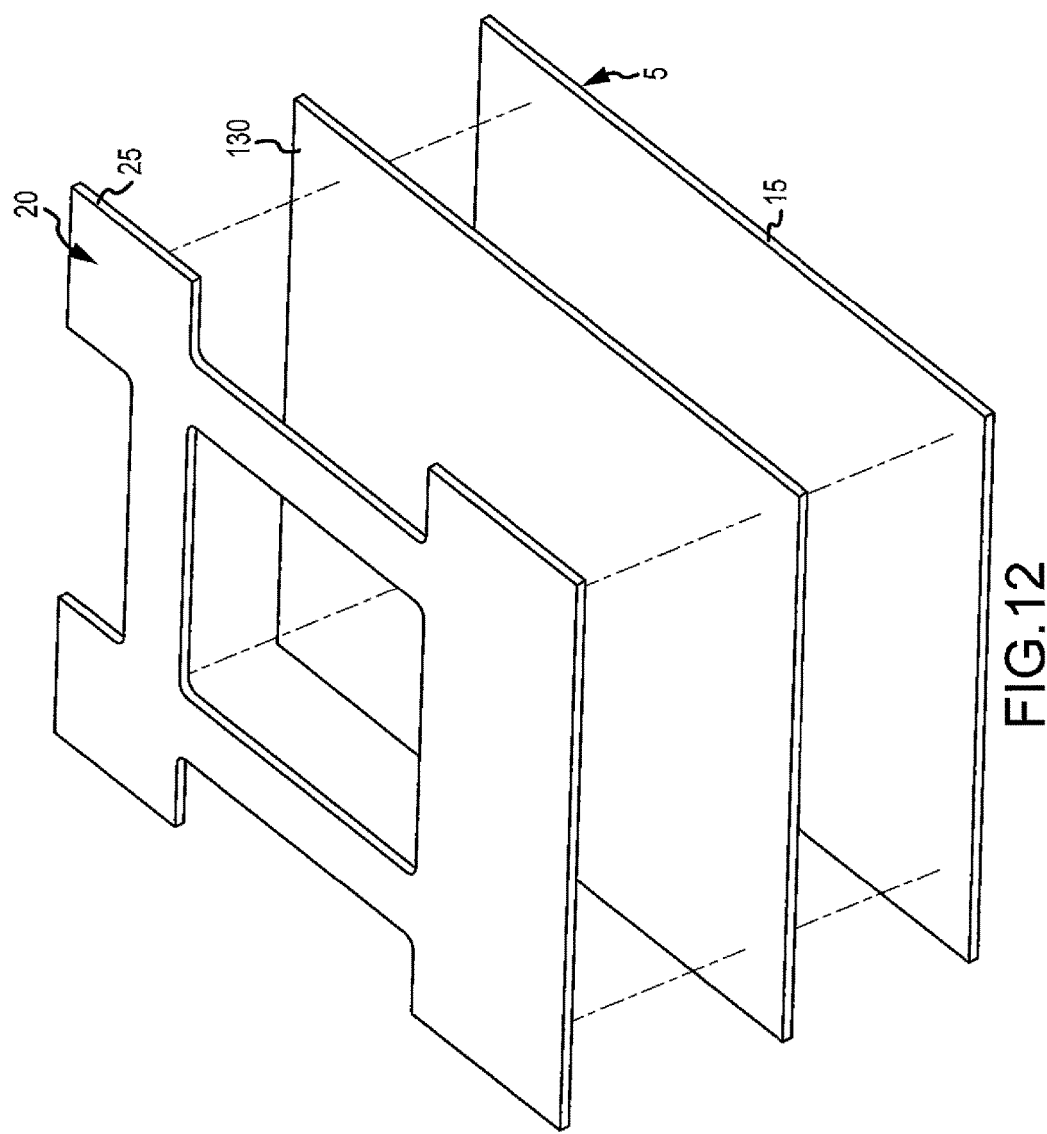
FIG. 12 shows an exploded view of another example of using multiple joined materials to form the luggage shell of FIG. 1.

FIG. 12 shows another example of using multiple materials to form the luggage shell 5 of FIG. 1 in one processing/forming step. With reference to FIG. 12, the shell 5 may include the outer layer 15, the structural layer 20, and an intermediate layer 130. The intermediate layer 130 is optional and may be omitted if desired.

As in previously described embodiments, the outer layer 15 may be formed using a softer material, such as nylon, polyester, cotton or other textiles, PU or other soft thermoplastic materials, EVA, and may be woven, non-woven or knitted fabrics. The structural layer 20 may be formed from a harder material, such as a hard polyolefin (e.g., polypropylene or polyethylene) or other type of foam, EVA, ABS, polycarbonate, or polypropylene. The intermediate layer 130 may be formed from a softer non-thermoformable or thermoformable foam. Suitable thermoformable foams may include a thermoformable polyolefin foam or a thermoformable EVA foam.

As described above, the outer layer 15 may be supported by the structural layer 20, and the outer layer 15 may be similar to the outer layer 15 described above in connection with FIGS. 1-4. The structural layer 20 may include a skeletal frame 25. The skeletal frame 25 and the outer layer 15 may be similar to the skeletal frame 25 and the outer layer 15 described above in connection with FIG. 4. However, the skeletal frame 25 may also define at least a portion of the base or bottom of the shell 5. In such embodiments, the base frame 30 may be omitted as the lower portion of the skeletal frame 25 may be sized and otherwise designed to support other components of the luggage case 10, such as the wheels and the telescoping handle.

The intermediate layer 130 may be substantially co-extensive with the outer layer 15, or may be sized to be smaller than the outer layer 15. In some embodiments, the intermediate layer 130 be approximately co-extensive with the skeletal frame 25. The intermediate layer 130 may have any desired thickness. In some embodiments, the intermediate layer 130 may have a thickness in the range of 3 to 5 mm.

The intermediate layer 130 may function to soften the transition between the skeletal frame 25 and the outer layer 15. The intermediate layer 130 may further function to mask the skeletal frame 25 from being visible through the outer layer 15. Yet further, when using a thermoformable foam for the intermediate layer 130, a desired texture, such as curved or straight lines, ridges, dots, and so on, may be formed in the intermediate layer 130. The desired texture may be visible through the outer layer 15 to create a desired look or feel for the outer surface of the shell 5.

Figure 13:
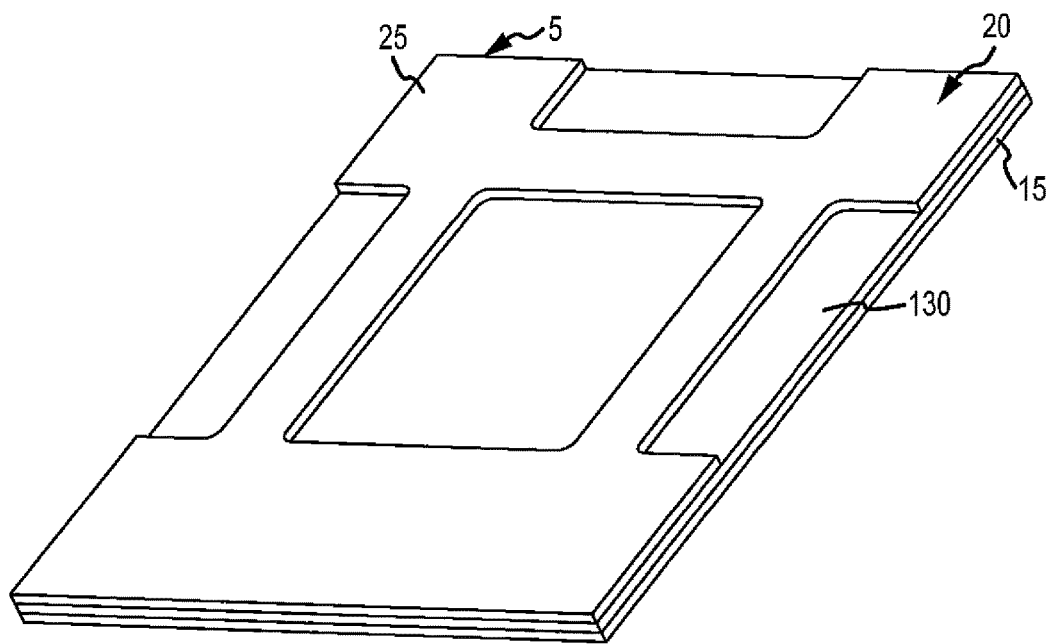
FIG. 13 shows the multiple materials of FIG. 12 joined together.

FIG. 13 shows the shell components shown in FIG. 12 joined together. With reference to FIG. 13, the intermediate layer 130 may be interposed between the outer layer 15 and the structural layer 20 when the components forming the shell 5 are joined. The components may be joined in a manner similar to those described above for the first example of using various components to form a shell 5. Further, in some embodiments, the outer, structural, and intermediate layers 15, 20, 130 may be joined together in a single molding or pressing operation. In other embodiments, however, a slightly different process may be used.

In an alternative process, the intermediate layer 130 and the outer layer 15 may first be joined together. These two layers 15, 130 may be joined using any suitable method. In some embodiments, the outer and intermediate layers 15, 130 are joined using an adhesive, such as a hot melt glue, a glue foil, a solvent glue, a powder glue, or other types of glues. The adhesive may be sprayed, rolled, scattered, or spread on the one or both of the abutting surfaces of the outer or intermediate layers 15, 130. After placing the adhesive, if any, on the intermediate layer 130 and/or the outer layer 15, the outer and intermediate layers 15, 130 may be pressed together, using rollers or other suitable press mechanisms. If desired, the outer and intermediate layers 15, 130 may be heated to a sufficient temperature to at least melt the adhesive. When heated, the outer and intermediate layers 15, 130 may be heated prior to, or during, the operation of compressing the layers 15, 130 together.

After the outer and intermediate layers 15, 130 are joined together, the structural layer 20 (e.g., the skeletal frame 25) may be joined to the outer and intermediate layers 15, 130. The structural layer 20 may be joined to these other two layers 15, 130 in a manner similar to the manner described above for the outer layer 15, the skeletal frame 25, and the base frame 30. In particular, the structural layer 20 may be positioned proximate the inside surface of the intermediate layer 130. The outer, structural, and intermediate layers 15, 20, 130 may then be joined together in a mold press, such as the mold press shown in FIGS. 6-8 or any other suitable molding or pressing machine. Further, as described above, the materials when joined together may be formed into the final shape of the shell 5 during the pressing operation, or may be formed into planar sheets that are later formed into the desired shape of the shell 5.

Prior to joining the materials, a suitable adhesive may be added to the abutting surfaces of the intermediate layer 130, the structural layer 20, or both, to enhance the bonding of the intermediate layer 130 to the structural layer 20. In some embodiments, the adhesive may be rolled, sprayed, scattered, or spread on the surface of the materials. After any adhesive is placed on the materials, the outer, structural, and intermediate layers 15, 20, 130 may be heated prior to, or during, the pressing process to at partially melt at least some of the layers 15, 20, 130 and/or any adhesive to further enhance the bond between the layers 15, 20, 130 after the pressing operation. The temperature for heating the outer, structural, and intermediate layers 15, 20, 130 may be selected based on the materials used for the layers 15, 20, 130 and/or the adhesive used. For example, in some embodiments that use a hot melt glue between the various layers 15, 20, 130, the layers 15, 20, 130 may be heated up to a temperature with the range of 130 to 160 degrees Celsius before being pressed, or otherwise joined, together to activate the hot melt glue.

The material used for the outer, structural, and intermediate layers 15, 20, 130 may be continuously feed into the pressing machine and then cut at appropriate locations to form individual shells 5. In other words, the operation for forming the shells 5 may be a continuous operation where material is continuously fed into the pressing machine and then, after the materials are joined together, cut from the rest of the materials to the desired size of the shell 5.

A liner may be joined to the outer, structural, and intermediate layers 15, 20, 130 are joined together to form the shell 5. The liner may be joined to the inner surface of the shell 5 after the outer, structural, and intermediate layers 15, 20, 130 are joined together, or may be joined these components prior to the components being pressed together. As described above, the liner may be formed from any appropriate softer material and may be joined to the other components of the shell 5 using any suitable joining method. When a fabric is used, a knitted fabric may be preferred over a woven fabric as knitted fabrics tend to be easier to stretch and often provide desired expandability for forming elements like pockets within the luggage case 10.

Figure 14:
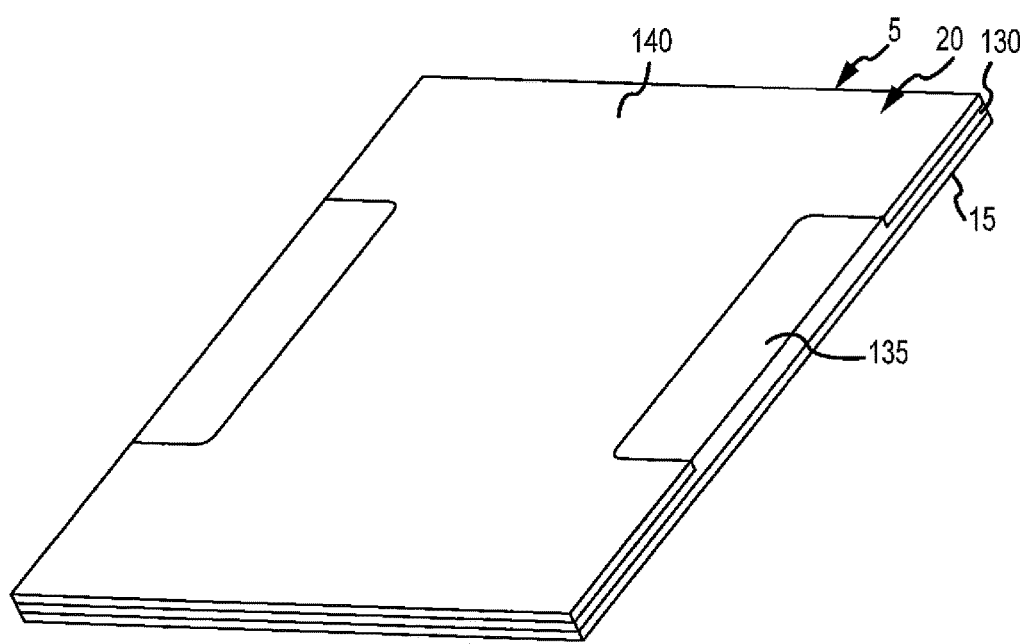
FIG. 14 shows a perspective view of another example of using multiple joined materials to form the luggage shell of FIG. 1.

FIG. 14 shows another way that the components shown in FIG. 13 may joined together. The components forming the shell 5 are similar to those in FIG. 13. In particular, the shell 5 may be formed using an outer layer 15, an intermediate layer 130, and a structural layer 20. However, the shell 5 differs in that structural layer 20 is pressed into the intermediate layer 130 during the joining operation. The structural layer 20 may be partially pressed into the intermediate layer 130 so that the inner surfaces 135, 140 of the structural layer 20 and the intermediate layer 130 do not align, or the structure layer 20 may be pressed into the intermediate layer 130 a sufficient distance such the inner surface 140 of the structural layer 20 is substantially co-planar with the inner surface 135 of the intermediate layer 130, such as shown in FIG. 14.

Advantageously, a relatively smooth inner surface of the shell 5 that is devoid of projections or protrusions may be formed when the inner surfaces 135, 140 of the structural and intermediate layers 20, 130 are substantially co-planar. Further, the thickness of the shell 5 may advantageously be substantially uniform throughout the shell 5 when the inner surfaces 135, 140 of the structural and intermediate layers 20, 130 are substantially co-planar. Yet further, when the components are formed into planar composite sheets, which may also be referred to as laminates, prior to forming the composite sheets into the final shape of the shell 5, the composite sheets 5 may have a relatively uniform thickness when the inner surfaces 135, 140 of the structural and intermediate layers 20, 130 are substantially co-planar, which helps to minimize space required for shipping or storing the composite sheets.

To create a composite sheet with the inner surfaces 135, 140 of the structural and intermediate layers 20, 130 substantially co-planar, in some embodiments, the intermediate layer 130 may be a thermoformable foam, the structural layer 20 may be an ABS plastic, and the thickness of the intermediate layer 130 may be greater than the thickness of the structural layer 20. For example, the thermoformable foam may have a thickness of approximately 4 to 5 mm and the ABS plastic may have a thickness of approximately 1.6 mm. Of course, any other suitable materials and thicknesses for the structural and intermediate layers 20, 130 may be used to create a composite sheet with the inner surfaces 135, 140 of the structural and intermediate layers 20, 130 substantially co-planar.

For any embodiment of a shell 5 that includes an intermediate layer 130, a pocket 115 may be formed that is accessed through the outer surface of the outer layer 15. The pocket 115 may be joined to the outer layer 15 in a similar manner as described for a shell 5 that does not include the intermediate layer 130. In some embodiments, the pocket 115 may be joined to the outer layer 15 before the intermediate layer 130 is joined to the outer layer 15. In other embodiments, the pocket 115 may be joined to the outer layer 15 after the intermediate layer 130 is joined to the outer layer 15. In some embodiments where a pocket 115 is joined to the outer layer 15 and is placed between the outer and intermediate layers 15, 130, it may be desirable to provide space for the pocket 115 between the outer and intermediate layers 15, 130. In such embodiments, the space may be created by forming an opening or a cavity in the intermediate layer 130. Such an opening or cavity may be formed prior to, or after, the intermediate layer 130 is joined to the outer layer 15.

The methods described herein allow for the forming, in one molding step, of a luggage case shell having an integral frame member supporting an outer layer, such as a fabric outer layer. A base frame may also be joined to the shell in the single molding step for supporting accessories like wheels and handles, if the additional strength is necessary. The structure and related process forms the integral skeletal frame in any of a great varieties of orientations and layouts based on the desires shape of the shell, with often the common feature being the skeletal frame providing the support to hold the outer layer in shape, provide some desirable protection for the contents of the case, and avoiding or minimizing the use of seams or other interferences in the major and minor faces, and transitions there-between, in the shape of the luggage case.

Although various representative embodiments of the structures for luggage shells and method of forming these shells have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A luggage case comprising:
   at least one shell including an outer layer of material, said outer layer of material including a major face, a plurality of minor faces, first transitions between said major and minor faces, and second transitions between said minor faces, said major face of said outer layer of material defining a major face of the at least one shell, and said plurality of minor faces defining opposing side faces, a top face, and a bottom face of the at least one shell;
   a separate skeletal frame supporting the outer layer of material, the skeletal frame positioned on and press-formed or vacuum-formed to the outer layer of material such that the skeletal frame is shaped and bonded together with the outer layer of material, and wherein the skeletal frame is flat and the outer layer of material is a flat sheet prior to the press forming or vacuum forming; and
   an intermediate layer interposed between the outer layer of material and the skeletal frame, the intermediate layer comprising a foam.

2. The luggage case of claim 1, wherein said skeletal frame comprises a material more rigid than said outer layer of material and/or at least one aperture.

3. The luggage case of claim 1, wherein said outer layer of material includes an absence of seams in said first transitions and/or said second transitions.

4. The luggage case of claim 1, wherein said skeletal frame extends along at least a portion of said first and/or second transitions.

5. The luggage case of claim 1, wherein said outer layer of material comprises one or more of the following materials: nylon, polyester, cotton or other textiles, polyurethane or other soft thermoplastic materials, or ethylene vinyl acetate.

6. The luggage case of claim 1, wherein said skeletal frame comprises one or more of the following materials: ethylene vinyl acetate, acrylonitrile butadiene styrene, polycarbonate, polypropylene, or polyolefin foam.

7. The luggage case of claim 1, wherein a base frame is integrally formed with a portion of said skeletal frame and said outer layer of material.

8. The luggage case of claim 1, further comprising a lining material integrally formed with a portion of said skeletal frame and said outer layer of material.

9. The luggage case of claim 1, wherein the at least one shell comprises a substantially uniform thickness.

10. The luggage case of claim 1, wherein the skeletal frame is adhered to the outer layer of material by an adhesive.

11. The luggage case of claim 1, wherein the skeletal frame is positioned on the inside surface of the outer layer of material and is coextensive with at least portions of the major and minor faces of the outer layer of material.

12. The luggage case of claim 1, wherein the skeletal frame is positioned on an internal surface of the outer material.

13. The luggage case of claim 1, wherein the foam is a non-thermoformable foam or a thermoformable foam.

14. The luggage case of claim 1, wherein the foam is a thermoformable polyolefin foam or a thermoformable EVA foam.

15. A method of forming a luggage shell comprising a formed shape of an outer material, said formed shape of the outer material comprising a major face, a plurality of minor faces, first transitions between said major and minor faces, and second transitions between said minor faces, said major face defining a major face of the luggage shell, and said plurality of minor faces defining opposing side faces, a top face, and a bottom face of the luggage shell, the method comprising:

positioning a flat skeletal frame in discrete areas on a separate flat sheet of an outer material;

joining an intermediate layer to the outer material either before or after positioning the flat skeletal frame, wherein the intermediate layer comprises a foam; and forming the luggage shell by press forming or vacuum forming so that the skeletal frame is formed into a shaped form for the skeletal frame, is integrally joined to the outer material, and supports the outer material in the formed shape for the outer material, the outer material taking on said formed shape after said step of forming the luggage shell.

16. The method of claim 15, wherein the skeletal frame is positioned on the inside surface of the outer material and is coextensive with at least portions of the major and minor faces of the outer material.

17. The method of claim 15, wherein said step of forming the luggage shell includes a molding step, and the outer material and said skeletal frame are shaped simultaneously into their respective shaped forms by said molding step.

18. The method of claim 17, further comprising joining said outer material and said skeletal frame together before or during said molding step.

19. The method of claim 15, further comprising applying an adhesive to at least one of the skeletal frame or the outer material prior to using a mold.

20. The method of claim 19, further comprising applying the adhesive to a surface of the skeletal frame that contacts a surface of the outer material or to a surface of the outer material that contacts the skeletal frame.

* * * * *